United States Patent [19]

Iyer et al.

[11] Patent Number: 4,458,741
[45] Date of Patent: Jul. 10, 1984

[54] METHOD OF ASPIRATION CASTING

[75] Inventors: Sankar P. Iyer, Kokomo, Ind.; Roy D. Lewis, Lachine, Canada; H. Joseph Klein, Kokomo, Ind.; William C. Hord, Greentown, Ind.; James C. Ailor, Kokomo, Ind.

[73] Assignee: Cabot Corporation, Kokomo, Ind.

[21] Appl. No.: 874,849

[22] Filed: Feb. 3, 1978

[51] Int. Cl.³ .............................................. B22D 27/16
[52] U.S. Cl. ..................................... 164/63; 164/131; 164/133
[58] Field of Search ................. 164/63, 131, 138, 132, 164/65, 61, 133, 254, 255, 256, 257

[56] References Cited

U.S. PATENT DOCUMENTS

| 1,488,545 | 4/1924 | Kadow | 164/254 |
| 1,514,909 | 11/1924 | Kadow | 164/257 |
| 1,763,710 | 6/1930 | Kadow | 164/256 |
| 2,379,401 | 6/1945 | Poulter | 164/63 |
| 2,539,625 | 1/1951 | Juppenlatz | 164/257 |
| 3,540,519 | 11/1970 | Yates | 164/131 X |
| 3,583,471 | 6/1971 | Kemming | 164/97 |

FOREIGN PATENT DOCUMENTS

| 39228 | 11/1971 | Japan | 164/63 |
| 554943 | 4/1977 | U.S.S.R. | 164/62 |

Primary Examiner—Gus T. Hampilos
Attorney, Agent, or Firm—Buell, Blenko, Ziesenheim & Beck

[57] ABSTRACT

A method for forming metal articles, such as rods and tubes by aspiration casting is provided in which a hollow frangible mold, such as a glass tube, is immersed at one end in a molten metal bath, a vacuum is applied to the other end controlled with respect to temperature of the molten metal so as to substantially fill the mold with a minimum of turbulence, the filled mold is withdrawn from the metal and the frangible mold is shattered to remove it from the metal article formed within.

2 Claims, 10 Drawing Figures

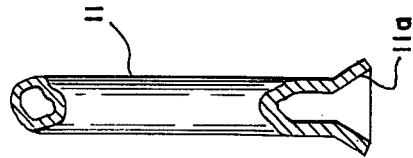
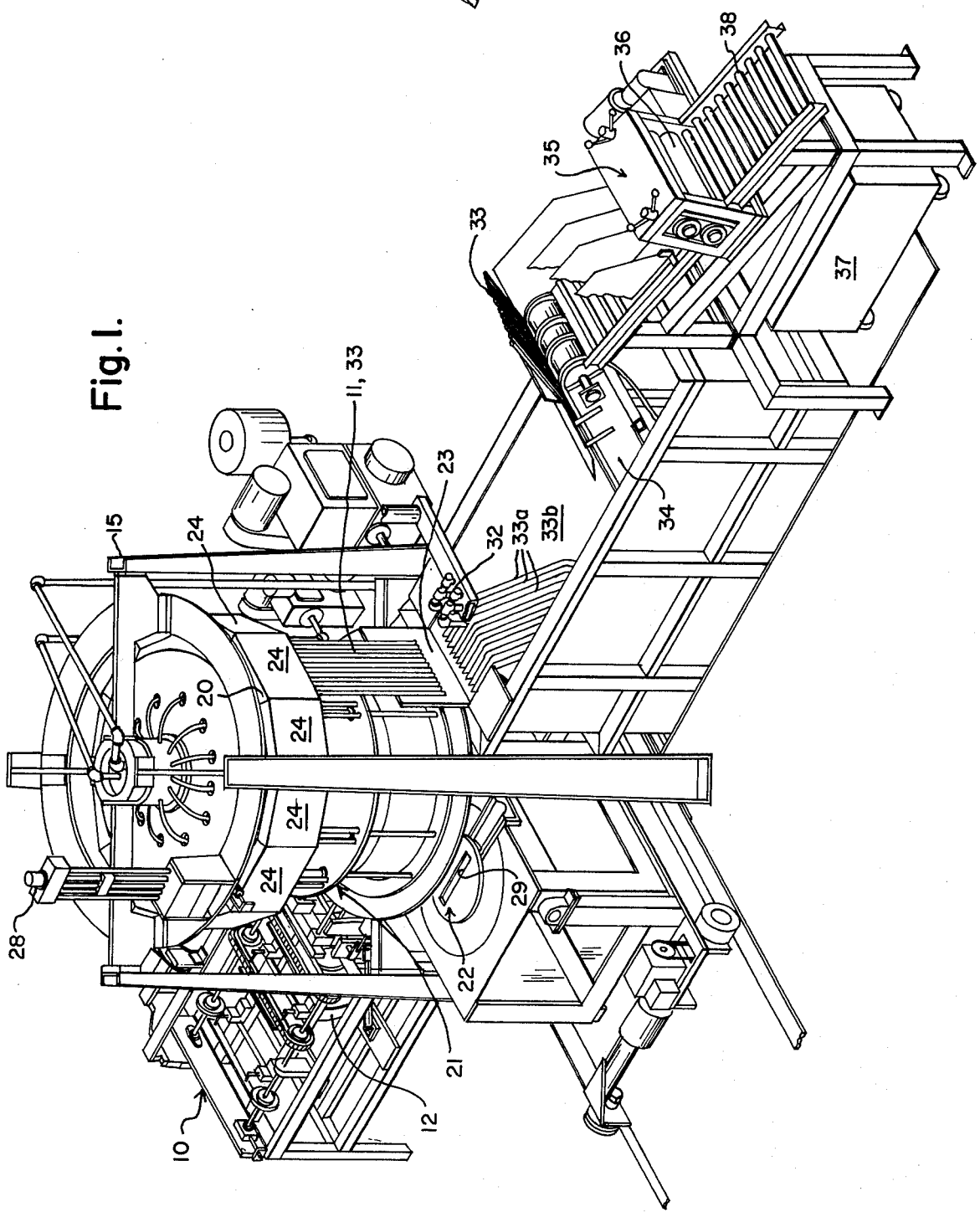

METHOD OF ASPIRATION CASTING

This invention relates to methods of casting and particularly to a method of aspiration casting of articles such as welding rods or wire to provide a more uniform casting with a more uniform smooth surface than heretofore possible.

Aspiration or suction casting of metal is not new. For example U.S. Pat. Nos. 1,488,545; 1,514,909; 1,763,710; 1,825,958; 2,379,401; 2,537,625 and 3,583,471 all describe molds and methods of casting by this means. Patents 2,537,625 and 3,583,471 specifically disclose methods for casting rods using vacuum as the driving force in the casting operation. There are, unfortunately, many problems inherent in such casting methods which have prevented their general adoption and use. One of the more desirable uses of such a method is the formation of welding rods out of molten superalloy compositions by aspiration of the molten metal into hollow glass tubes. Several problems are, however, inherent in such practice. First, the ends of the tubes tend to soften and pinch, restricting the flow of molten metal into the glass tubes, particularly in smaller sizes. Second, the production of an unduly large number of unfilled tubes and rods with high porosity which results from too much vacuum or lack of control thereof. Third, the problem of glass removal and disposal is a significant one.

All of these problems are solved by the practice of the present invention. We have developed methods for controlling the step of aspiration casting to provide uniform lengths of high quality rods, and of glass removal to provide undamaged, straight rods with smooth surfaces.

In the present invention we provide a process of aspiration casting which includes the steps of attaching one end of a hollow frangible mold such as a tube to a source of vacuum, means controlling the vacuum so that on application of the vacuum, the bottom end of the mold experiences a controlled increase in vacuum such that most of the turbulence in the fluid flow which results in surface defects is eliminated, submerging the other end of the mold into a metal bath to be cast, applying vacuum to said mold at a level related to the temperature of the metal so that the metal rises rapidly within the mold, removing the mold from the molten metal bath while maintaining it under vacuum until solidified, rapidly cooling said frangible mold to cause it to break away from the metal contained therein, and removing said mold from said solidified article. Preferably, the mold and contents are removed vertically from the molten bath and then moved to the discharge station by slowly accelerating to a maximum and then decelerating slowly to a stop in a sine wave fashion which prevents the mold and contained metal from bending or breaking during the removal step. Preferably glass tubes are used as the molds in this invention and they are preferably of borosilicate glass composition. In the preferred practice of this invention a surge tank or accumulator is used in the vacuum line to establish a predetermined vacuum at the time aspiration begins, and thus avoid the sudden changes in vacuum which otherwise occurs when casting is started. The other or bottom end of the tubes which are immersed into the molten metal bath may be flared outwardly in frusto conical form to prevent or at least retard their closing under the high temperature.

This method may also be used to make hollow metal tubes by quickly withdrawing the filled frangible tube and releasing the vacuum to permit the molten metal to run out of the center of the rod to form a hollow. Further, the process of this invention may be used to produce other shaped articles from a correspondingly shaped mold.

The apparatus which is preferably used in connection with this invention includes a mold assembly station in which, in a preferred embodiment, a plurality of glass tubes are assembled and held in spaced relation, a mandrel having a plurality of vertically moving side-by-side vacuum heads spaced apart a distance equal to that of the tubes in the assembly station adapted to engage at one end the plurality of hollow tubes to be filled under vacuum assembled at the assembly station, means for transferring said glass tubes from the assembly station to the vacuum heads, means for moving said mandrel over a molten bath of metal, indexing means stopping said mandrel over said bath with a head generally centered thereover, means for lowering and raising the centered head and thereby immersing and removing the other end of said glass tubes in said molten metal, means for applying vacuum to said centered head when the said other end of the glass tubes is immersed in the molten metal and maintaining said vacuum until the metal in said glass tubes has a solidified, means for transferring filled tubes to a cooling means through a sine curve path of acceleration and deceleration, cooling means adapted suddenly to cool the glass tubes to cause them to crack from around the metal contained within them, rod conveyor means beneath the cooling means receiving the metal rods and glass from the cooling means and permitting any separated broken glass to fall through, a glass conveyor means beneath and transverse to said rod conveyor receiving the broken glass falling through the rod conveyor, and glass remover means receiving the rods for removing remaining glass thereon.

In the foregoing general description of this invention certain objects, purposes and advantages have been set out. Other objects, purposes and advantages of this invention will be apparent from a consideration of the following description and the accompanying drawings in which:

FIG. 1 is a schematic view of an apparatus according to this invention;

FIG. 10 is an enlarged fragmentary side elevation, partly in section showing the flared end on a glass tube mold.

Figure 2:
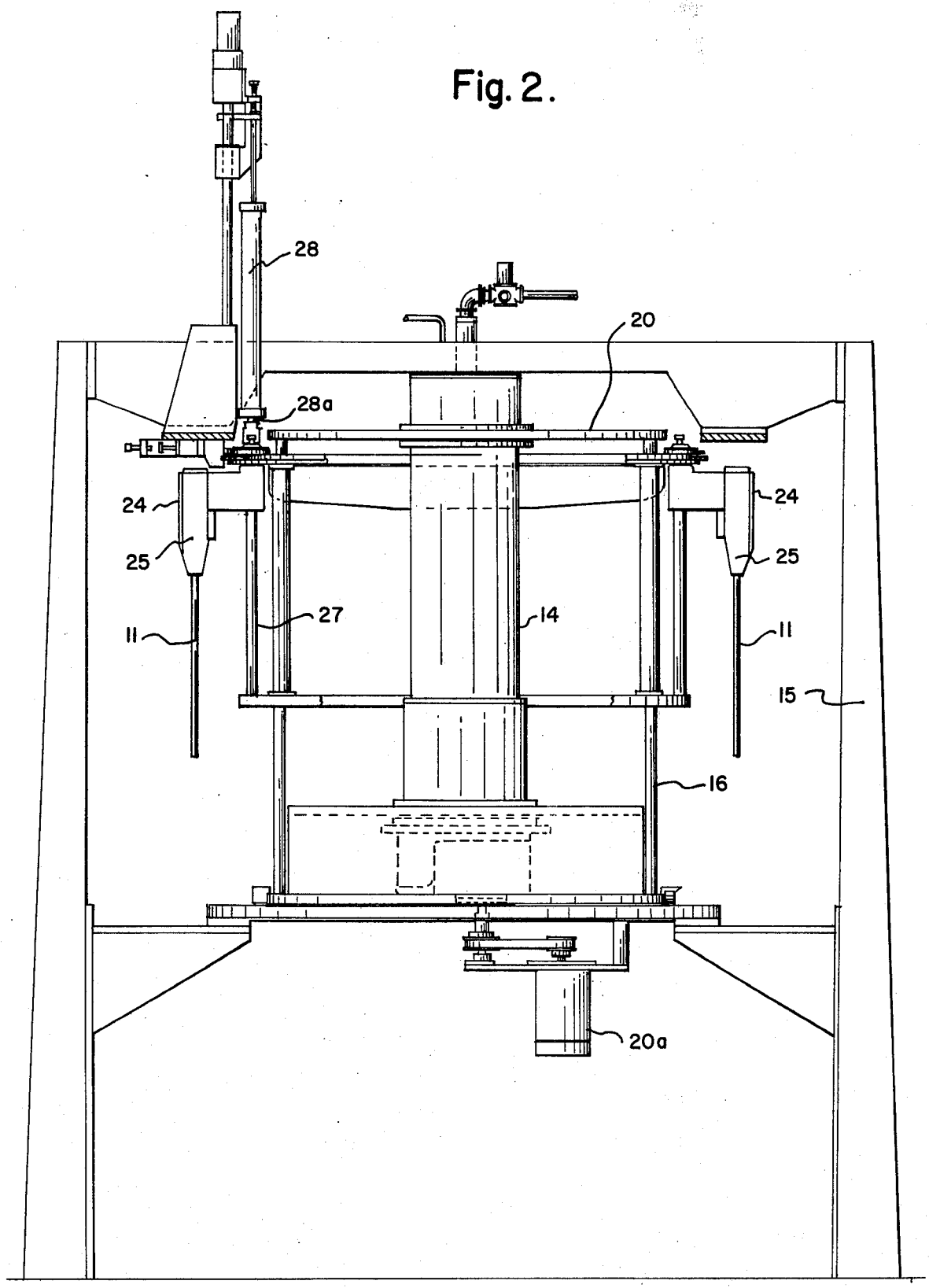
FIG. 2 is a side elevation of an aspiration rod forming apparatus of this invention.
Figure 9:
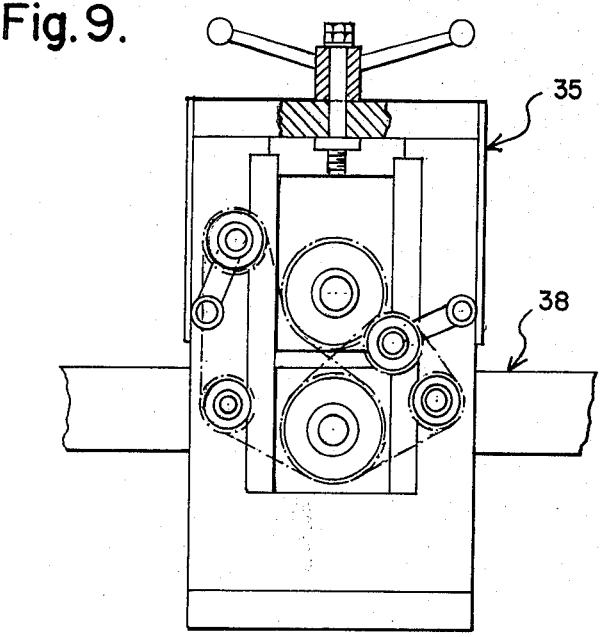
FIG. 9 is a side elevational view, partly in section, of a glass remover assembly.
Figure 3:
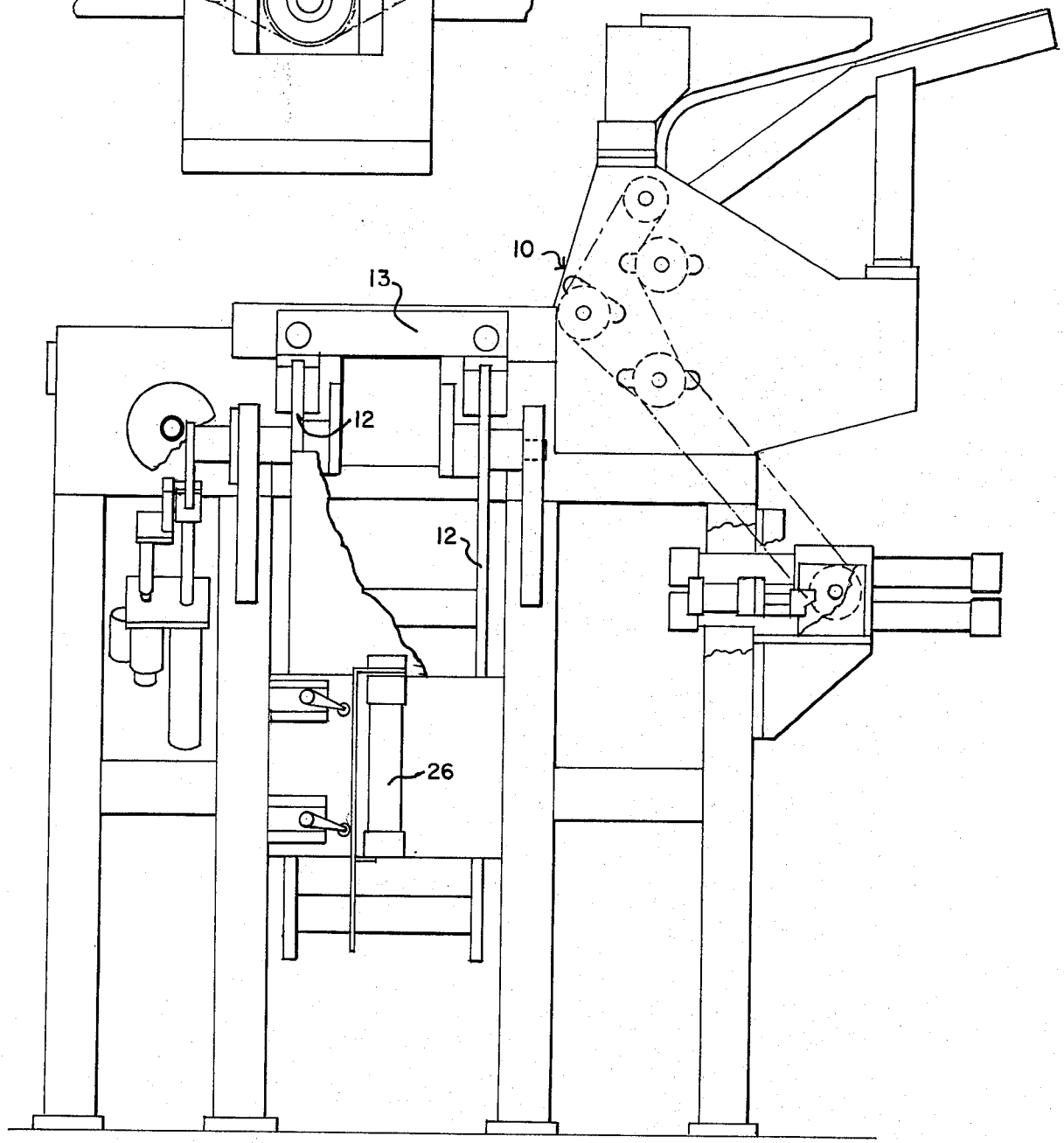
FIG. 3 is a side elevation view of the glass tube assembly unit.
Figure 4:
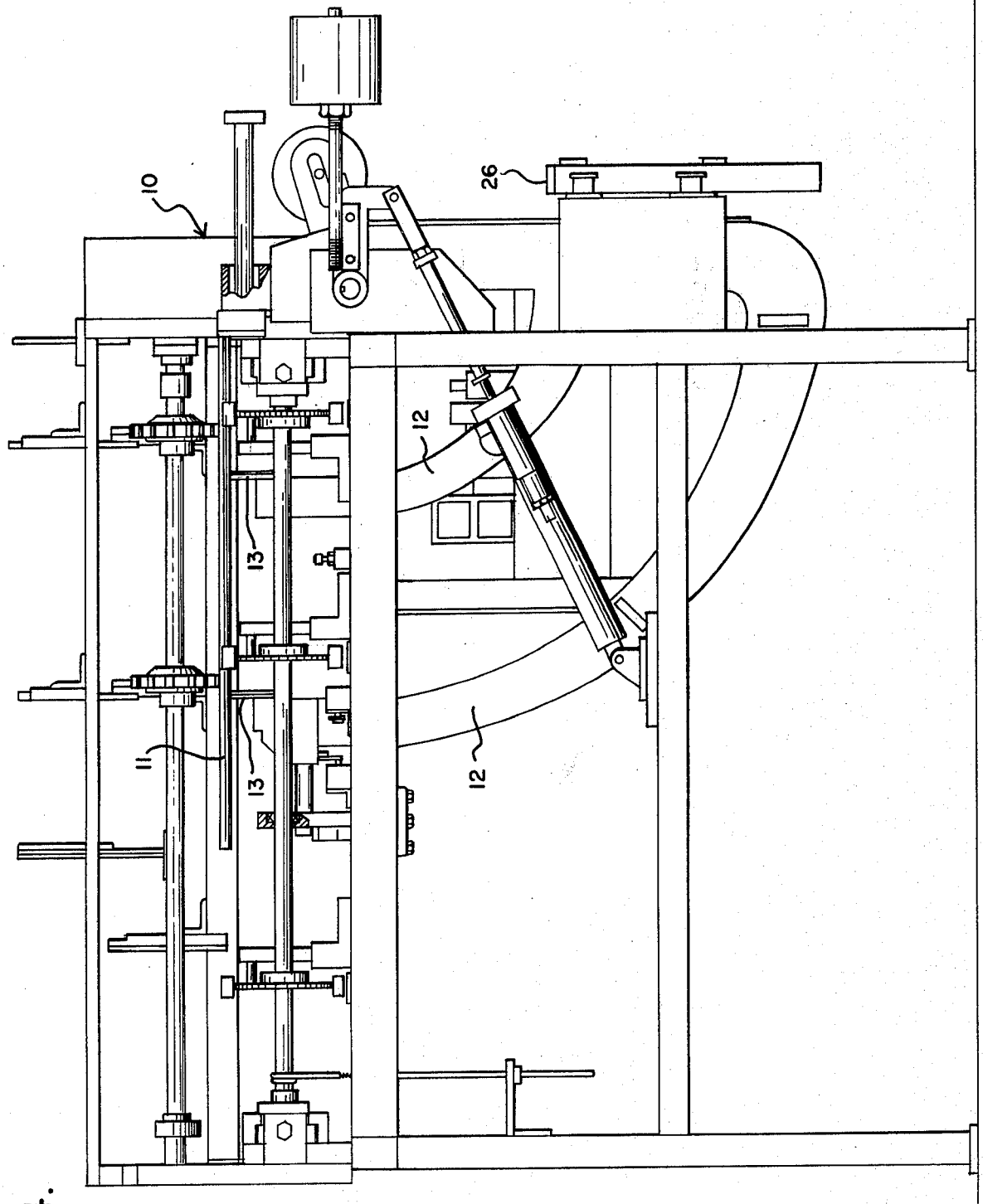
FIG. 4 is an end elevational view of the glass tube assembly unit and means for transferring the tubes to the mandrel.
Figure 5:
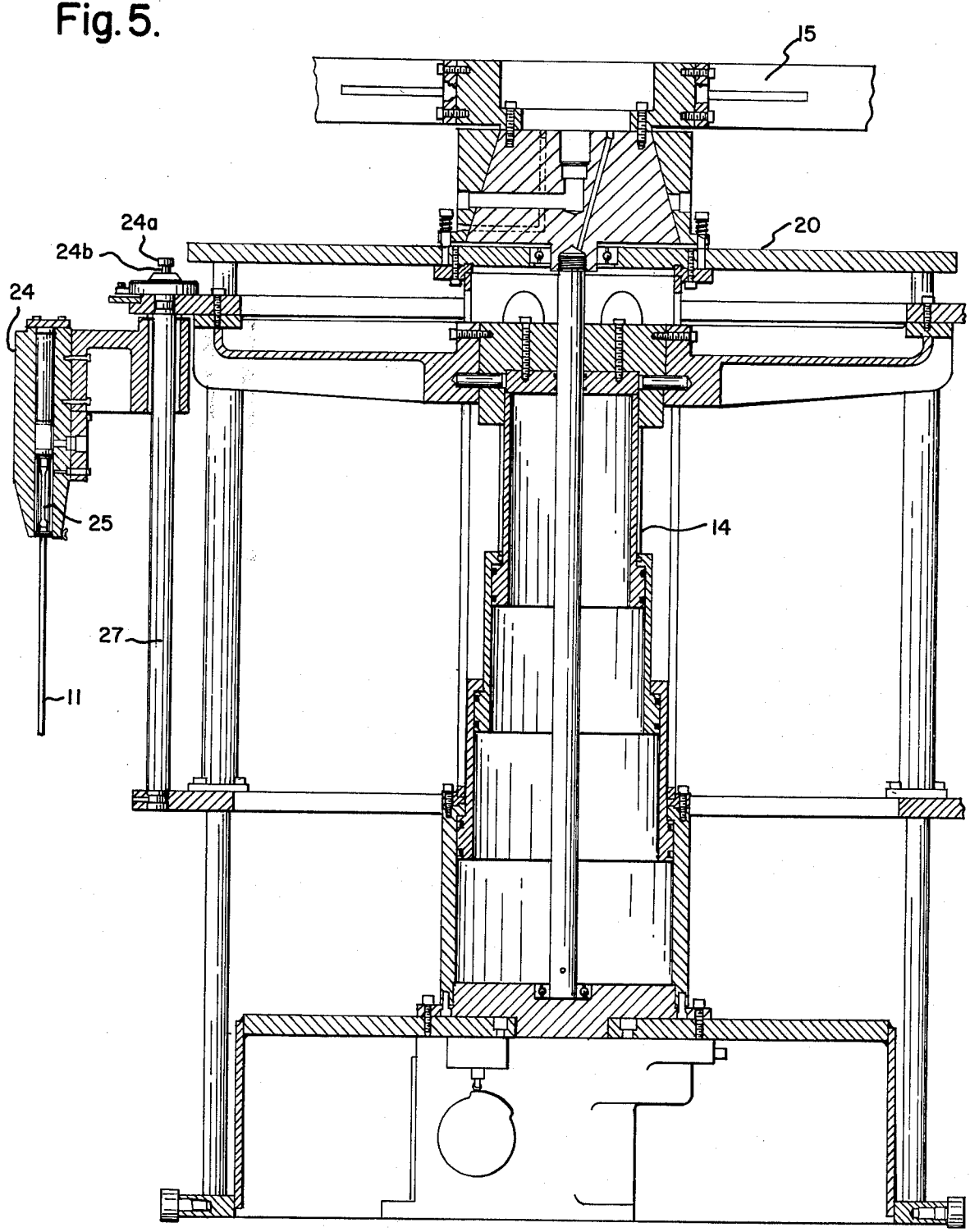
FIG. 5 is a vertical section through the rod forming apparatus of FIG. 1.
Figure 8:
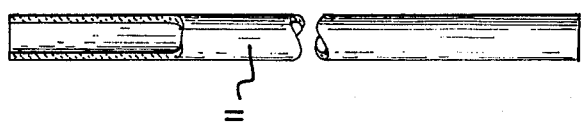
FIG. 8 is a side elevation view partly in section of a glass tube as used in this invention.
Figure 6:
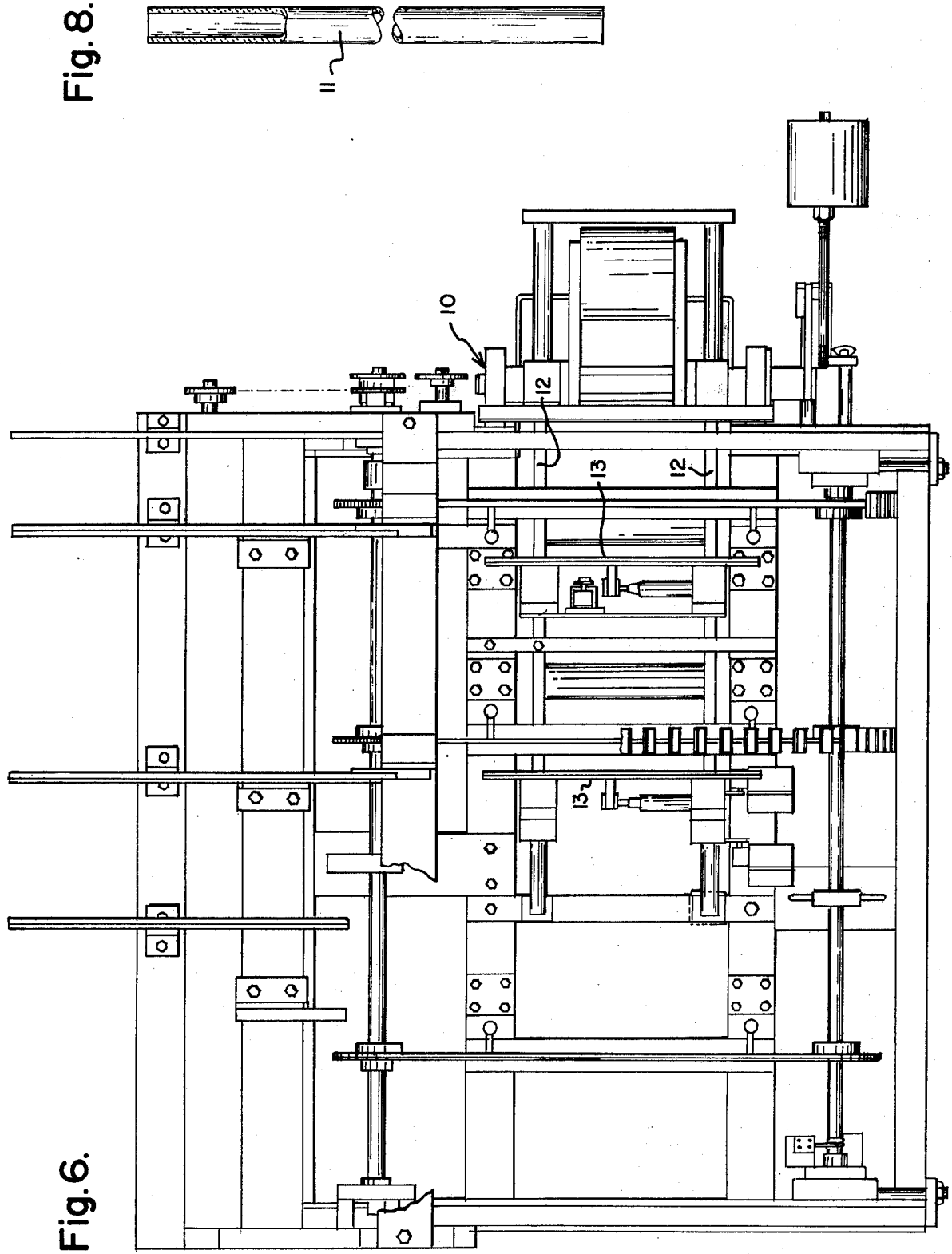
FIG. 6 is a top plan view of the glass tube assembly unit of FIG. 3.
Figure 7:
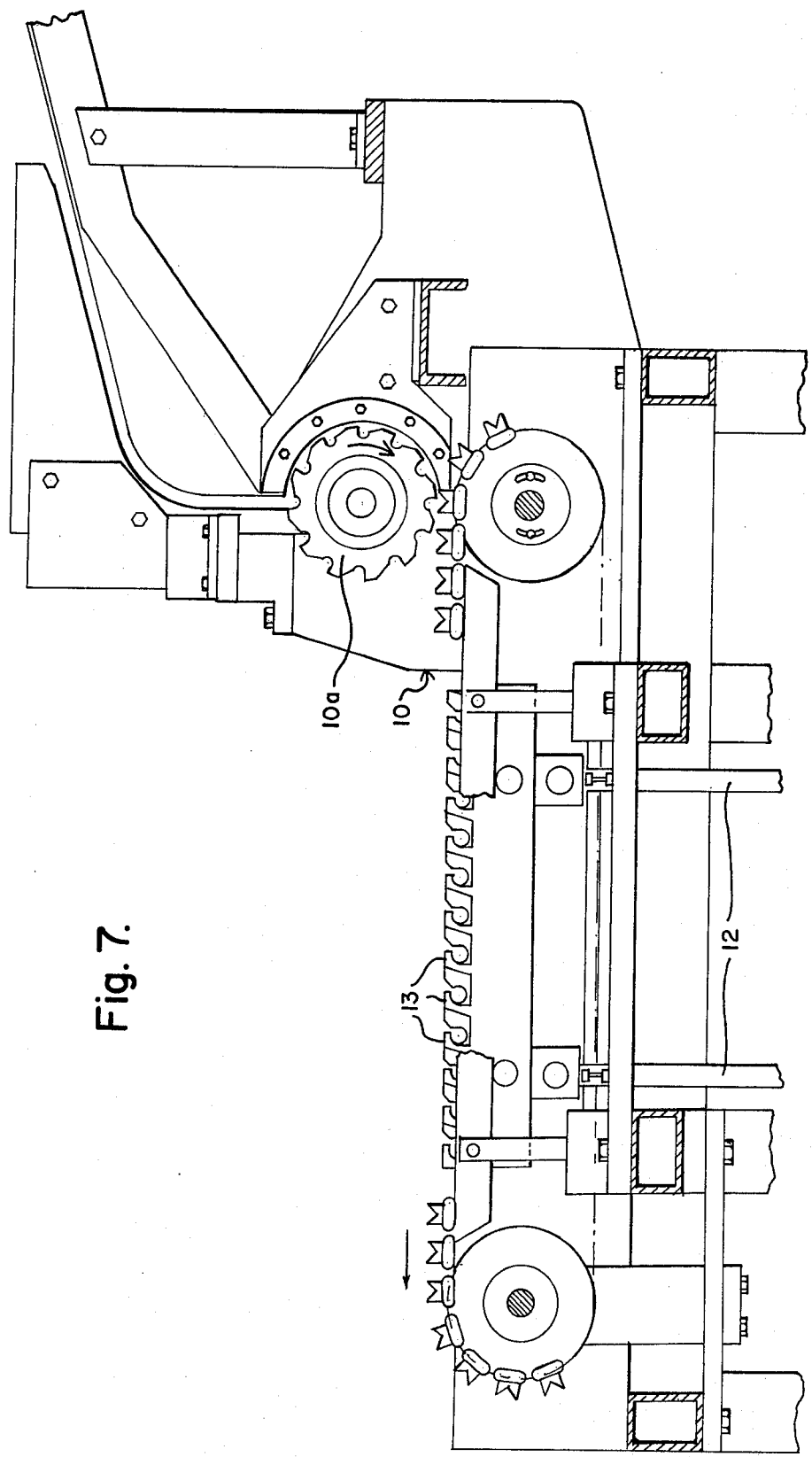
FIG. 7 is a fragmentary section on the line VII—VII of FIG. 6.

Referring to the drawings there is illustrated a tube assembly unit 10 on which the glass tubes 11 are placed on their sides and delivered by toothed wheel 10a to spacer feed chain 10b and then to a lift arm 12 having spaced fingers 13 which hold an array of twelve side-by-side spaced tubes. A mandrel 20 having twelve sides adapted for rotation in successive steps by motor drive 20a from a tube loading station 21 adjacent the tube assembly unit 10 to an aspiration station 22 and to an unloading station 23 is provided on a multiple stage telescopic fluid cylinder 14 within a vertical frame 15. Mandrel 20 is movable on vertical guides 16. The mandrel 20 is provided with twelve spaced apart heads 24 one on each side of the mandrel. Each head 24 is in turn provided with a plurality (preferably 12) vacuum chucks 25 adapted to receive one end of a glass tube 11 to be used for forming a metal rod. The glass tubes 11 are attached to the vacuum chucks 25 of a head 24 at the loading station 21. This is accomplished by rotating lift arm 12 from the horizontal position on tube assembly unit 10 to a vertical position beneath a head 24 with the glass tubes aligned with vacuum chucks 25. The tubes 11 are moved vertically upwardly into chucks 25 by pusher 26. The mandrel is then moved to bring head 24 to the aspiration station 22. Head 24 is slidably mounted on spaced rods 27 extending vertically on mandrel 20. An air cylinder 28 with piston 28a is mounted above mandrel 20 at the aspiration station. Piston 28a is provided with a slotted end 28b which slides over the flange head 24a on pin 24b fixed on head 24. Moving piston 28a in and out of cylinder 28 raises and lowers head 24 to submerge the free end of glass tubes 11 into the molten bath of metal 29 at aspiration station 22. When the free ends of glass tubes 11, which may be flared outwardly in frusto conical shape 11a, as illustrated in FIG. 10, are inserted into bath 29, vacuum is applied to the interior of the tubes through chucks 25 and through a surge tank from a source of vacuum, not shown. The temperature of the molten bath and the vacuum are correlated so as to draw metal into each glass tube for substantially its full length before solidification closes off the tube. The cylinder 28 is then actuated to raise piston 27 and head 24 so that the head 24 and attached glass tubes and metal are moved upwardly out of the metal bath. The mandrel is then moved circumferentially from above the metal bath to the unload station with a gradual acceleration and deceleration. A sine curve path is preferred as this form of motion has been found to be effective in preventing undue bending and breakage of the glass tubes and metal rods contained therein. While the head 24 is being raised vacuum is continuously applied to the tubes through vacuum fittings 25 to prevent metal from running out.

During the time one head is being loaded with tubes and another is being filled at the aspiration station, a second head 24 is located at the unload station 23 where water sprays 32 rapidly cool and shock the glass tubes causing them to shatter away from the formed metal rods 33. The rods 33 held in a vertical position by guide ribs 33a in tank 33b fall onto a conveyor 34 along with that portion of shattered glass which breaks away. The broken glass and rods are conveyed by conveyor 34. At the exit of conveyor 34 the glass falls to bin 37 while the rods continue on to a glass removal assembly 35. This glass removal assembly 35 subjects the glass to a multiplicity of closely spaced teeth on rolls 36 which fracture the glass retained on the rods into small pieces and remove it from the metal rods. The glass is collected in bin 37 for removal and disposal and the rods are discharged onto a conveyor 38 to be carried to an inspection and sizing station, not shown.

In the foregoing specification certain preferred embodiments and practices of this invention have been set forth, however, it will be understood that this invention may be otherwise embodied within the scope of the following claims.

We claim:

1. The method of forming a metal article by aspiration comprising the steps of:
   a. attaching one end of a hollow frangible mold to a source of vacuum,
   b. immersing the other end of said mold in molten metal to be cast,
   c. adjusting the vacuum and the temperature of the molten metal so that said mold can be substantially filled on immersion of said mold in molten metal with a minimum of turbulence prior to solidification,
   d. applying vacuum to said one end of the mold on immersion of said mold to draw molten metal into the mold,
   e. removing the mold from the molten metal while maintaining vacuum thereon until the metal in the mold has solidified into a desired article,
   f. transferring the mold and contained metal from a first position after removal from the molten metal to a second position spaced from the first postion through a sine curve path of acceleration and deceleration, and
   g. thereafter shattering the mold in said second position.

2. The method of forming a metal article by aspiration comprising the steps of:
   a. attaching one end of a hollow frangible tube to a source of vacuum,
   b. immersing the other end of said tube in molten metal to be cast,
   c. adjusting the vacuum and the temperature of the molten metal so that said tube can be substantially filled on immersion of said mold in molten metal with a minimum of turbulence prior to solidification,
   d. applying vacuum to said one end of the tube on immersion of said tube to draw molten metal into the mold,
   e. removing the tube from the molten metal while maintaining vacuum thereon until the metal in the tube has solidified into a desired rod,
   f. transferring the tube and contained metal rod from a first position after removal from the molten metal to a second position spaced from the first position through a sine curve path of acceleration and deceleration, and
   g. thereafter shattering the tube mold in said second position to release the metal rod therein.

* * * * *